United States Patent
Kitayama et al.

[11] Patent Number: 6,159,408
[45] Date of Patent: Dec. 12, 2000

[54] MOLDED ARTICLE MADE OF FIBER-REINFORCED THERMOPLASTIC MATERIAL AND PROCESS FOR PRODUCING THE SAME

[75] Inventors: Takeo Kitayama, Takatsuki; Shigeyoshi Matsubara, Osaka, both of Japan

[73] Assignee: Sumitomo Chemical Company, Ltd., Osaka, Japan

[21] Appl. No.: 09/114,224

[22] Filed: Jul. 13, 1998

[30] Foreign Application Priority Data

Jul. 15, 1997 [JP] Japan ................................ 9-189504

[51] Int. Cl.⁷ .................................................. B29C 53/00
[52] U.S. Cl. ............... 264/240; 264/211.22; 264/211.23; 156/181
[58] Field of Search ..................... 428/402, 294, 428/407; 264/240, 211, 211.12, 211.18, 211.14, 211.15, 211.21, 211.22, 211.23; 156/166, 181, 441, 173, 175

[56] References Cited

U.S. PATENT DOCUMENTS

| | | | |
|---|---|---|---|
| 4,549,920 | 10/1985 | Cogswell et al. | 156/181 |
| 4,559,262 | 12/1985 | Cogswell et al. | 428/294 |
| 5,019,450 | 5/1991 | Cogswell et al. | 428/402 |
| 5,213,889 | 5/1993 | Cogswell et al. | 428/332 |

*Primary Examiner*—Merrick Dixon
*Attorney, Agent, or Firm*—Pillsbury Madison & Sutro LLP

[57] ABSTRACT

A disclosed process for producing a molded article made of fiber-reinforced thermoplastic material includes providing a molding machine containing a plasticizing apparatus having an opening for receiving raw materials, an apparatus for feeding the raw materials to the plasticizing apparatus and a molding apparatus having a cavity; feeding both thermoplastic material in a solid state and reinforcing fibers with a length from about 3 mm to about 50 mm simultaneously into the plasticizing apparatus through the opening from the feeding apparatus; melting the thermoplastic material and kneading the thermoplastic material and the reinforcing fibers in the plasticizing apparatus to produce kneaded material comprising the thermoplastic material and the reinforcing fibers; supplying the kneaded material to the molding apparatus from the plasticizing apparatus; and molding the kneaded material into the molded article in the cavity is provided. Also, a molded article made of the fiber-reinforced thermoplastic material which is obtained by the above process and contains the reinforcing fibers with a weight average length of about 2 mm or more is provided.

8 Claims, 6 Drawing Sheets

MOLDED ARTICLE MADE OF FIBER-REINFORCED THERMOPLASTIC MATERIAL AND PROCESS FOR PRODUCING THE SAME

BACKGROUND OF THE INVENTION

1. Field of the Invention

The present invention relates to a molded article made of fiber-reinforced thermoplastic material and a process for producing the same.

2. Description of Related Art

In the past, molded articles made of thermoplastic resin reinforced with fibers, such as glass fibers, have been well-known. There also has been known a process for producing the molded article made of the fiber-reinforced thermoplastic resin, the process comprising the steps of: melt-kneading the thermoplastic resin with reinforcing fibers in an extruder to produce pellets of the fiber-reinforced thermoplastic resin in which the reinforcing fibers are contained in the thermoplastic resin; feeding the pellets into an injector to melt and knead the same again to produce kneaded material; and supplying the kneaded material into a mold to form the same into a predetermined form. As a process for preparing the pellets of the fiber-reinforced thermoplastic resin by way of melt-kneading the thermoplastic resin with the reinforcing fibers, there has been known a process comprising the steps of: providing an extruder having a first opening for receiving the thermoplastic resin and a second opening, which is provided in the down flow area from the first opening, for receiving the reinforcing fibers; feeding the thermoplastic resin into the extruder through the first opening to plasticize the same in a melting zone of the extruder; adding the reinforcing fibers to the thermoplastic resin, which has reached the second opening, through the second opening; kneading the plasticized thermoplastic resin and the reinforcing fibers in a portion of the extruder between the second opening and the outlet of the extruder; and pelletizing the kneaded material. However, a problem with this method is that a large device of complex structure is required to be used because the extruder has the opening for receiving the thermoplastic resin and the opening for receiving the reinforcing fibers, separately. Additionally, the aforementioned method, in which the previously produced pellets of the fiber-reinforced thermoplastic resin are again melted and kneaded in the extruder, is problematic in that the use of the kneaded material produced by the method usually results in a molded article made of the fiber-reinforced thermoplastic resin which contains fibers of extremely short length and has undesirable physical properties because kneading of the materials is carried out in the extruder and the injector, separately, twice in total.

Several methods for producing the molded article made of the fiber-reinforced thermoplastic resin without using the pellets of the fiber-reinforced thermoplastic resin also have been known. Japanese unexamined patent publication No. Hei 2-153714, for example, discloses a method comprising the steps of: providing an injector having a first opening for receiving the thermoplastic resin and a second opening, which is provided at a down flow area from the first opening, for receiving the reinforcing fibers; feeding the thermoplastic resin through the first opening into the injector to melt the same in a melting zone of the injector; feeding the reinforcing fibers into the injector through the second opening; kneading the molten thermoplastic resin and the reinforcing fibers in the injector; and supplying the kneaded material directly into the mold to form the same. Japanese unexamined patent publication No. Hei 6-8278 discloses a method comprising the steps of: providing an injector which is provided with a single opening for receiving raw materials; feeding both the reinforcing fibers and the thermoplastic resin simultaneously into the injector through the opening; kneading the materials in the injector; and supplying the kneaded materials directly into the mold to form the same. However, the molded article made of the fiber-reinforced thermoplastic resin obtained by the above method is not always satisfactory in its physical properties such as an impact strength, because the molded article merely contains reinforcing fibers having a length of 400–500 $\mu$m at most.

SUMMARY OF THE INVENTION

One object of the present invention is to provide a molded article made of fiber-reinforced thermoplastic material wherein the molded article is excellent in physical properties such as impact strength.

Another object of the present invention is to provide a process for producing molded article made of the fiber-reinforced thermoplastic material, the molded article being excellent in physical properties such as the impact strength.

According to one aspect of the present invention, there is provided a molded article made of fiber-reinforced thermoplastic material which is obtained by a process comprising the following steps of:

providing a molding machine comprising a plasticizing apparatus having an opening for receiving raw materials, an apparatus for feeding the raw materials to the plasticizing apparatus and a molding apparatus having a cavity;

feeding both thermoplastic material in a solid state and reinforcing fibers with a length from about 3 mm to about 50 mm simultaneously into the plasticizing apparatus through the opening from the feeding apparatus;

melting the thermoplastic material and kneading the thermoplastic material and the reinforcing fibers in the plasticizing apparatus to produce kneaded material comprising the thermoplastic material and the reinforcing fibers;

supplying the kneaded material to the molding apparatus from the plasticizing apparatus; and molding the kneaded material into the molded article in the cavity, wherein the molded article contains reinforcing fibers with a weight average length of about 2 mm or more.

One embodiment of the aspect may be a molded article made of the fiber-reinforced thermoplastic material which contains the reinforcing fibers having a ratio of a weight average length to a number average length of 1.1 or more. Another embodiment of the aspect may be a molded article made of the fiber-reinforced thermoplastic material wherein the content of the reinforcing fibers falls within the range of from about 20% by weight to about 75% by weight. A still another embodiment of the aspect may be a molded article made of the fiber-reinforced thermoplastic material which contains the reinforcing fibers having a diameter from about 6 $\mu$m to about 25 $\mu$m.

According to another aspect of the present invention, there is provided a process for producing a molded article made of fiber-reinforced thermoplastic material, the process comprising the following steps of:

providing a molding machine comprising a plasticizing apparatus having an opening for receiving raw materials, an apparatus for feeding the raw materials to the plasticizing apparatus and a molding apparatus having a cavity;

feeding both thermoplastic material in a solid state and reinforcing fibers with a length from about 3 mm to about 50 mm simultaneously into the plasticizing apparatus through the opening from the feeding apparatus;

melting the thermoplastic material and kneading the thermoplastic material and the reinforcing fibers in the plasticizing apparatus to produce kneaded material comprising the thermoplastic material and the reinforcing fibers;

supplying the kneaded material to the molding apparatus from the plasticizing apparatus; and molding the kneaded material into the molded article in the cavity.

Hereafter, the molded article made of the fiber-reinforced thermoplastic material will be referred to as a "fiber-reinforced molded article".

DESCRIPTION OF PREFERRED EMBODIMENTS

Figure 1:
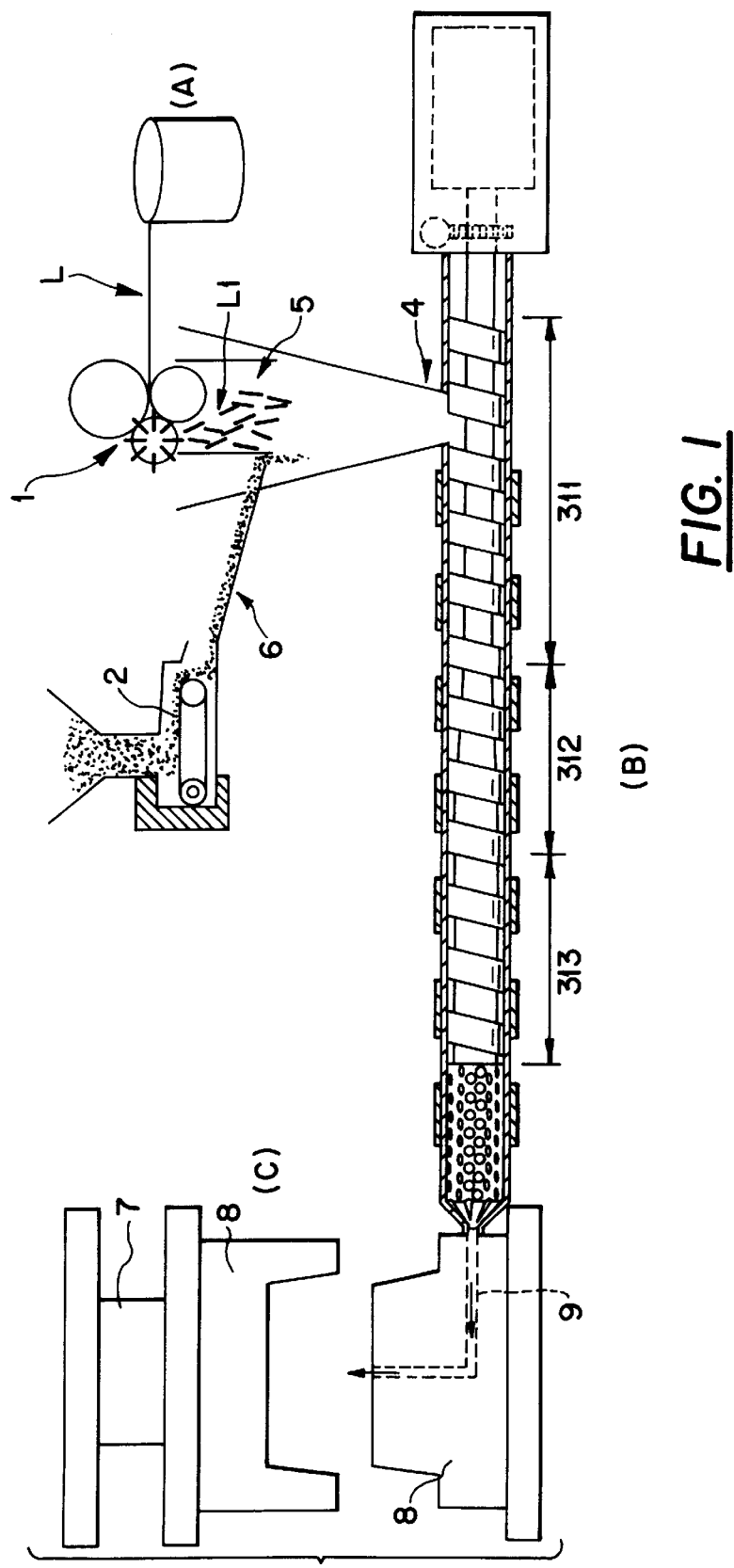
FIG. 1 is a diagrammatical section of one example of a machine used for producing the fiber-reinforced molded article of the present invention.

The thermoplastic material applied to the present invention may be thermoplastic materials which are applicable to conventional molding methods such as injection molding, injection compression molding, extrusion molding and stamping molding. Examples of such thermoplastic materials include thermoplastic resins such as polyolefins, e.g., polyethylene and polypropylene, polystyrene, polycarbonate, acrylonitrile-styrene-butadiene block copolymer; thermoplastic elastomers such as ethylene-propylene block copolymer and styrene-butadiene block copolymer; and thermoplastic polymer alloys.

The thermoplastic material may contain additives, which can normally be used in processing thermoplastic materials, such as a filler, e.g., talc; a pigment; an antistatic agent; and an antioxidant.

The reinforcing fibers applied to the present invention are not restricted as long as they are able to reinforce the thermoplastic material, and may be fibers which have been used for reinforcement of thermoplastic materials, such as glass fibers, carbon fibers, alumina fibers and aramid fibers.

A weight average length of the reinforcing fibers contained in the fiber-reinforced molded article of the present invention is about 2 mm or more, preferably from about 2 mm to about 50 mm. The fiber-reinforced molded article containing the reinforcing fiber of such weight average length is excellent in physical properties such as impact strength. The weight average length of the reinforcing fibers contained in the fiber-reinforced molded article can be determined by the following procedure. A piece cut from the fiber-reinforced molded article is burned with direct fire to remove the thermoplastic material. About 130 to 150 fibers are arbitrarily gathered to be measured both weight and length of each fiber. Based on the weight and the length measured, the weight average length of the reinforcing fibers are calculated according to the following equation (1):

$$Lw=\Sigma(Li \times Wi)/\Sigma Wi \qquad (1)$$

wherein Lw is a weight average length (mm) of the reinforcing fibers. Li and Wi are a length (mm) and a weight (g) of the i-th fiber, respectively. The fiber-reinforced molded article of the present invention with the ratio of the weight average length to the number average length of about 1.1 or more, preferably from about 1.1 to about 2, becomes superior both in the impact strength and in appearance. The number average length of the reinforcing fibers can be determined according to the following equation (2):

$$Ln=\Sigma(Li \times Ni)/\Sigma Ni \qquad (2)$$

wherein Ln is the number average length (mm) of the reinforcing fibers and Ni is the number of the reinforcing fiber with a length of Li (mm). A content of the reinforcing fibers in the fiber-reinforced molded article is not particularly limited, but it preferably falls within the range of from about 20% by weight to about 75% by weight from the viewpoint of physical properties of the fiber-reinforced molded article. Furthermore, the fiber-reinforced molded article preferably contains the reinforcing fibers with a diameter of from about 6 $\mu$m to about 25 $\mu$m.

The fiber-reinforced molded article of the present invention is produced by a process comprising the following steps of:

providing a molding machine comprising a plasticizing apparatus having an opening for receiving raw materials, an apparatus for feeding the raw materials to the plasticizing apparatus and a molding apparatus having a cavity;

feeding both thermoplastic material in a solid state and reinforcing fibers with a length of from about 3 mm to about 50 mm simultaneously into the plasticizing apparatus through the opening from the feeding apparatus;

melting the thermoplastic material and kneading the thermoplastic material and the reinforcing fibers in the plasticizing apparatus to produce kneaded material comprising the thermoplastic material and the reinforcing fibers;

supplying the kneaded material to the molding apparatus from the plasticizing apparatus; and molding the kneaded material into the molded article in the cavity. Hereinafter, the opening provided to the plasticizing apparatus for receiving the raw materials is referred to as a material-feed opening.

The thermoplastic material in the solid state are not particularly limited in size and shape as long as it can be fed into the plasticizing apparatus and kneaded. The thermoplastic materials in a form of pellets, granules or powders may be normally used in the present invention.

The reinforcing fibers to be fed into the plasticizing apparatus are not particularly limited in form as long as they are from about 3 mm to about 50 mm long. Chopped strands, which are produced by cutting a roved strand (a continuing strand) containing several hundreds or several thousands of monofilaments having a diameter of from about 6 $\mu$m to about 25 $\mu$m bundled with a binder into about 3 mm to about 5 mm length, is preferably employed. The present invention may use either the chopped strand which has been previously cut into a predetermined length and stored or the chopped strand which has cut into the predetermined length with a roving cutter provided near the material-feed opening of the plasticizing apparatus, directly. The roved strand is preferably treated with a surface sizing agent in order to enhance bonding strength of its surface with the thermoplastic material. The kind of the surface sizing agent may be chosen depending mainly upon the kind of the thermoplastic material used.

Modified thermoplastic material which can be bonded to the reinforcing fibers is preferably used in order to attain a firm bond between the thermoplastic material and the reinforcing fibers. It also is preferable that a modifier for making the thermoplastic material capable of bonding with the reinforcing fibers is fed into the plasticizing apparatus with the thermoplastic material and the reinforcing fibers. For example, in cases where polypropylene and glass fibers are used, respectively, as the thermoplastic material and the reinforcing fibers, polypropylene modified with maleic acid is preferably used as the polypropylene. It also is preferable that unmodified polypropylene, glass fibers and maleic acid as a modifier are fed into the plasticizing apparatus together. Although the modifier is often used in a form of pellets, it may be used in a form of granules or powders in order to attain its good dispersion into the thermoplastic material. Normally, the modifier is dry-blended with the thermoplastic material in the solid state, and then the resulting mixture is fed into the plasticizing apparatus together with the reinforcing fibers, followed by carrying out the steps of melting and kneading in the plasticizing apparatus. In order to maintain the reinforcing fibers long in the plasticizing apparatus, it is preferred to avoid kneading strongly. However, kneading too gently results both in insufficient dispersion of the modifier in the thermoplastic material and in an undesirable effect. A modifier with a relatively small particle size is preferably used so as to attain a desirable effect of the modifier even kneading weakly. The use of thermoplastic material in which the modifier has previously compounded is also preferred. An amount of the modifier compounded varies depending upon an amount and a kind of the reinforcing fibers, a kind of the thermoplastic material, and the like, but it is normally falls within the range of from about 1% by weight to about 15% by weight based on the weight of the thermoplastic material.

In a fiber-reinforced molded article produced by using the above-mentioned raw materials, it is preferred that almost every strand is loosened into monofilaments which uniformly disperse in the thermoplastic material, and that the molded article has few voids. The unloosened strand and the void may cause deterioration of the physical properties of the fiber-reinforced molded article.

The fiber-reinforced molded article of the present invention is produced by the method comprising the following steps of:

providing a molding machine comprising a plasticizing apparatus having an opening for receiving raw materials, an apparatus for feeding raw materials to the plasticizing apparatus and a molding apparatus having a cavity;

feeding both thermoplastic material in a solid state and reinforcing fibers with a length of from about 3 mm to about 50 mm simultaneously into the plasticizing apparatus through the opening from the feeding apparatus;

melting the thermoplastic material and kneading the thermoplastic material and the reinforcing fibers in the plasticizing apparatus to produce kneaded material comprising the thermoplastic material and the reinforcing fibers;

supplying the kneaded material to the molding apparatus from the plasticizing apparatus; and molding the kneaded material into the molded article in the cavity. Several examples of the production process of the fiber-reinforced molded article of the present invention will be described below, but the scope of the present invention should not limited to the examples.

FIG. 1 shows one example of the molding machine for producing the fiber-reinforced molded article of the present invention. The molding machine includes a plasticizing apparatus (B), a molding apparatus (C) and an apparatus (A) for feeding raw materials into the plasticizing apparatus (B). The raw material-feeding apparatus (A) illustrated in FIG. 1 has a roving cutter (1) for discharging the reinforcing fibers with a predetermined length, a quantitative feeder (2) for discharging the thermoplastic material in the solid state, and a hopper (4) for introducing the reinforcing fibers from the roving cutter (1) and the thermoplastic material from the feeder (2) into the plasticizing apparatus (B). The plasticizing apparatus (B) may be a screw-type injector (3) having the material-feed opening which opens with facing the hopper. The plasticizing apparatus may be either another type of injector or an extruder. The molding apparatus (C) may comprise a mold (8) and a press device (7) having a clamping mechanism. The quantitative feeder for discharging the chopped strands which have been previously cut into the predetermined length may be employed in place of the roving cutter (1). The quantitative feeder (2) for discharging the thermoplastic material may be replaced with another device which can discharge the thermoplastic material quantitatively. The reinforcing fibers from the roving cutter (1) and the thermoplastic material from the quantitative feeder (2) are introduced by the hopper (4) and fed into the injector (3) simultaneously through the common material-feed opening. In the example shown in FIG. 1, an inner pipe (5) is provided over the hopper (4). The reinforcing fibers cut into the predetermined length by the roving cutter (1) are fed inside the inner pipe (5). The quantitative feeder (2) is equipped with a shoot (6). The thermoplastic material discharged from the quantitative feeder (2) naturally flows down on the shoot (6) to be fed into a space lying between an inner wall of the hopper (4) and an outer wall of the inner pipe(5). The injector (3) has the material-feed opening which opens with facing the hopper. The reinforcing fibers, which are introduced by the hopper, are fed into the injector through the material-feed opening. An tip end of the injector (3) is connected with the mold (8). The kneaded material produced in the injector (3) can be injected into the cavity through a passage (9) provided in the mold (8).

Hereafter, the above-outlined apparatus will be described in detail.

[Roving Cutter (1)]

Figure 2:
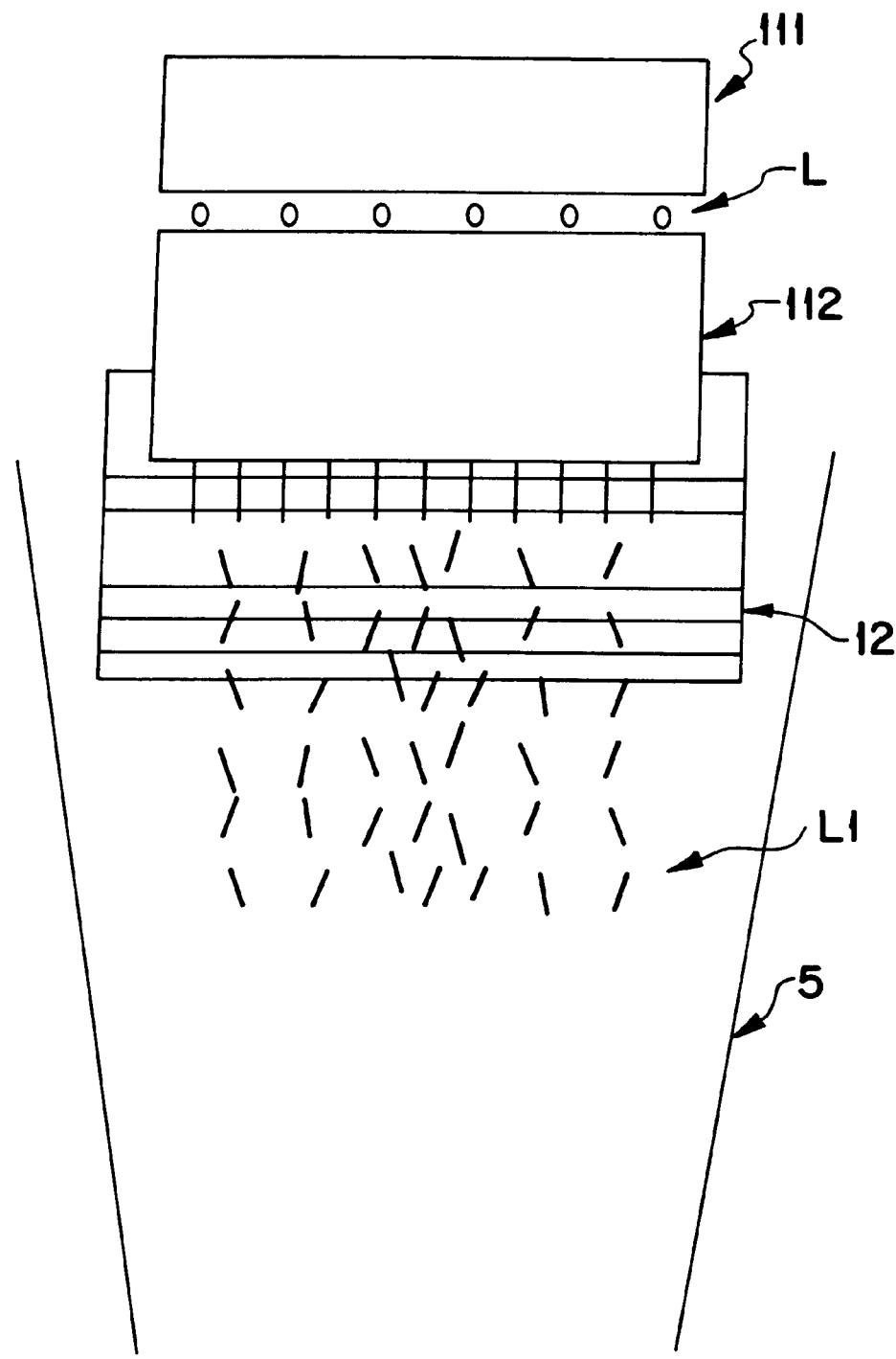
FIG. 2 is a diagram showing the relation between the roving cutter and the feed rollers shown in FIG. 1.

The roving cutter (1) has, as schematically shown in FIG. 2, a first feeding roll (111) and a second feeding roll (112) for sending out roved fibers (L) with spreading them, and a cutting roll (12) provided on the exit side of the feeding rolls and having a width wider than the spreading width of the roved fibers (L) spread by the feeding rolls. The cutting roll

(12) has at least one cutting blade which can contact with the second feeding roll (112) when rotating. The roved fibers (L) is cut by the cutting blade and the second feeding roll (112) into a predetermined length and drop forward the inner pipe (5). The cutting roll (12) is provided so that the cut reinforcing fibers (L1) fall inside the inner pipe (5). A length of the cut reinforcing fiber (L1) may be determined depending upon a pitch of the cutting blade(s) provided on the cutting roll (12). The pitch is set so that the reinforcing fibers are cut into about 3–50 mm, preferably about 3–25 mm. In the example shown in FIG. 2, four roved glass fibers of 2400 tex are sent into nip defined by the first feeding roll (111) and the second feeding roll (112) to be cut into 14 mm length. In this example, the cut reinforcing fibers (L1) are discharged from the roving cutter at a speed of 2.2 kg per minute. The yarn number and the number of the roved fibers to be sent to the roving cutter, the discharging speed of the cut reinforcing fibers from the roving cutter, and the like may be suitably changed. In this example, polypropylene was used as the thermoplastic material, and roving glass fibers whose surface had been treated with modified polypropylene was employed in order to enhance the adhesiveness between polypropylene and the reinforcing fibers.

[Quantitative Feeder (2)]

Figure 3:
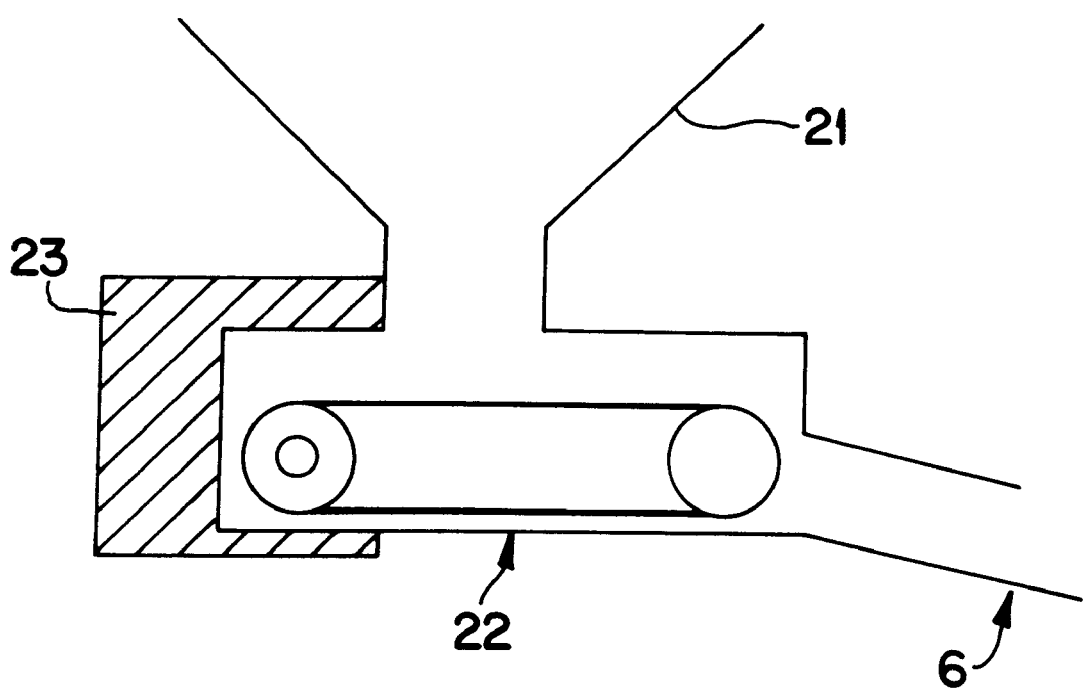
FIG. 3 is a diagram showing a specific structure of the quantitative feeder shown in FIG. 1.

The quantitative feeder (2) has, as schematically shown in FIG. 3, a hopper (21) for accumulating the thermoplastic material in the solid state, and a conveyer (22) for conveying the thermoplastic material supplied from the hopper (21). The discharging speed of the thermoplastic material from the quantitative feeder (2) can be controlled by adjusting the rotating speed of a motor for driving the conveyer (22). The thermoplastic material discharged from the quantitative feeder (22) slips down on the shoot which is connected with the quantitative feeder and are fed into a space lying between the inner wall of the hopper (4) and the outer wall of the inner pipe (5).

The modifier and other additives may be supplied to the quantitative feeder together with the thermoplastic material. For example, the thermoplastic material, the modifier and the additives may be dry-blended, followed by being supplied to the quantitative feeder. In this example, pellets of polypropylene resin (commercial name: Sumitomo Noblen AX568; manufactured by Sumitomo Chemical Co., Ltd.) as the thermoplastic material and a modifier with a particle diameter of 1.5 mm or less (commercial name: Umex; manufactured by Sanyo Chemical Industries, Ltd.) were dry-blended, and then the blend was supplied to the quantitative feeder so that a supplying speed of the polypropylene pellets became 5.1 kg/min.

[Hopper (4)]

The hopper (4) is a member for allowing both the reinforcing fibers (L1), which was cut into the predetermined length and discharged by the roving cutter (1), and the thermoplastic material discharged from the quantitative feeder (2) to be contacted and mixed with each other and to be introduced toward the material-feed opening of the injector (3).

Although the hopper (4) may be made of any materials, it is preferred that the hopper is made of a material which is difficult to generate static electricity even if it collides or contacts with the reinforcing fibers and the thermoplastic material. The hopper (4) may be equipped with a vibrator (43) so that the reinforcing fibers do not attach to the hopper. Air may be blown on a part of the hopper (4) where the reinforcing fibers tend to attach because of static electricity.

Accumulating the reinforcing fibers and the thermoplastic material constantly in the hopper (4) in an amount within a predetermined range results in a stable plasticizing speed. Therefore, the hopper (4) is preferably equipped with means for controlling the amount of the accumulated reinforcing fibers and thermoplastic material. As such means, in this example, an upper switch (41) for detecting an upper limit of an upper surface of the accumulated materials, and a lower switch (42) for detecting an lower limit of the upper surface of the accumulated materials are provided to the hopper (4). When the upper surface of the accumulated materials in the hopper (4) reaches the lower switch by supplying the materials into the injector (3), the roving cutter (1) and the quantitative feeder (2) start to work, and feeding of the reinforcing fibers and the thermoplastic material into the hopper (4) is commenced. When the upper surface of the accumulated materials in the hopper (4) reaches the upper switch (41), the roving cutter (1) and the quantitative feeder (2) are stopped to work, and feeding of the reinforcing fibers and the thermoplastic material is quitted. An angle ($\theta$) between the inner wall of the hopper (4) and a vertical line is normally 45° or less, particularly 30° or less, and typically 15° or less.

This example employed a hopper made of stainless steel coated with a polyethylene terephthalate film having a thickness of 0.4 mm, as the hopper (4). The hopper (4) was equipped with the upper switch (41) and the lower switch (42) with an interval of 150 mm. The hopper (4) had a oval section in a horizontal direction and an angle between its inner wall and the vertical line of 10°.

[Inner Pipe (5)]

The inner pipe (5) provided in the hopper (4) leads the reinforcing fibers (L1) dropping from the cutting roll (12) to the vicinity of the center of the hopper (4). Although the inner pipe (5) may be made of any materials, it is preferred that it is made of a material which is difficult to generate static electricity even if it collides with the reinforcing fibers and the thermoplastic material.

Diameters of an upper opening (51) and an lower opening (52) of the inner pipe (5) may be either equal to or different from each other. The upper opening means an entrance of the inner pipe for receiving the reinforcing fibers (L1). The lower opening is an exit of the inner pipe for discharging the reinforcing fibers. However, the diameter of the lower opening (52), normally, is shorter than that of the upper opening (51). An angle ($\theta'$) between the inner wall of the inner pipe (5) and a vertical line is 30° or less, preferably 15° or less. Vibrating the inner pipe (5) has an effect on preventing the reinforcing fibers from attaching to the inner wall of the inner pipe (5) resulting in clogging the inner pipe (5). The inner pipe (5) may be vibrated by a vibrator. Alternatively, when the pellets of the thermoplastic material are supplied into the hopper (4), the inner pipe (5) may be vibrated by the collision of the pellets with the outer wall of the inner pipe.

This example used, as the inner pipe (5), a pipe made of stainless steel whose inner surface was coated with a polyethylene terephthalate film with a thickness of 0.4 mm. Diameters of the upper opening (51) and the lower opening (52) were 65 mm each. The pellets of the thermoplastic material was fed into the hopper (4) so as to collide with the outer wall of the inner pipe (5) to vibrate the same.

[Screw Type Injector (3)]

Figure 4:
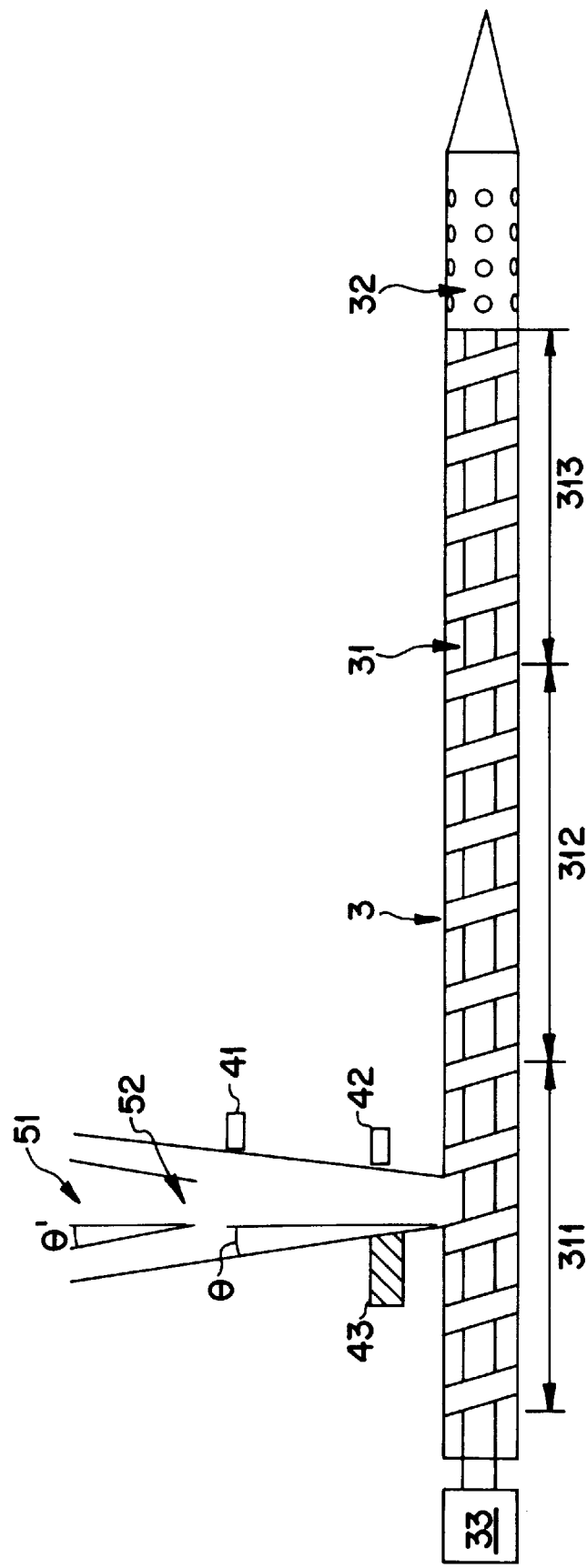
FIG. 4 is a diagram of a screw-type injector shown in FIG. 1.

The screw type injector (3) is, as illustrated in FIG. 4, provided with an opening for receiving the reinforcing fibers and the thermoplastic material in the solid state. The opening is referred to as a "material-feed opening".

The screw (31) of the injector (3) preferably requires that a part of the screw positioning under the material-feed opening satisfies the following inequality (3):

$$\{(p/2)^2 \times \pi - (q/2)^2 \times \pi\} \times r \geq 350 \quad (3)$$

in order to prevent the reinforcing fibers from breaking to maintain the reinforcing fibers in the kneaded material relatively long while kneading the thermoplastic material and the reinforcing fibers in the injector. In the inequality (3), p, q and r, respectively, indicate an inner diameter (cm) of a barrel, a diameter (cm) of the screw at its groove bottom, and a flight pitch (cm) of the screw. While the groove bottom of the screw is made round, the value of the smallest part between the flights is selected as the value of q. Although the diameter of the material-feed opening is normally set equal to a diameter of the barrel, the flight pitch of the screw, r, in the inequality (3) is replaced with the diameter of the material-feed opening when the diameter of this opening is smaller than r.

In the injector, the screw retracts with its rotation, and therefore, a part of the screw which positions under the material-feed opening changes with the rotation of the screw. The inequality (3) is preferably satisfied for all parts of the screw which may come under the material-feed opening. In this example, the diameter of the material-feed opening was 12 cm, p was 12, q was 8.7 and r was 10.8. Hence, the value of the left side of the inequality (3) was 579.

In order to control cutting the reinforcing fibers during the step of kneading the thermoplastic material and the reinforcing fibers with plasticizing the thermoplastic material in the injector (3), the screw (31) preferably is a full flight screw. A mixing head having a check ring mechanism is preferably provided to the tip portion of the screw. This example employed a full flight screw equipped with the mixing head (32) to its tip end.

The screw (3) can be sectioned, from its rear end to its tip end, into three zones including a feed zone (311), a compression zone (312) and a metering zone (313). In the screw used in this example, a groove depth of the feed zone (311) was set to 16.5 mm and a groove depth of the metering zone (313) was set to 5.25 mm. A groove depth of the compression zone (312) was tapered from 16.5 mm to 5.25 mm. The ratio among the lengths of the feed zone (311), the compression zone (312) and the metering zone (313) was set to 2:1:1. The flight pitch of the screw (31) in its full flight portion was set to 120 mm, which was equal to the diameter of the screw. A compression ratio of the screw (31) preferably is 4 or less. An apparent shear rate preferably is $10 \sec^{-1}$ or less. The compression ratio and the apparent shear rate are given by the following equations (4) and (5), respectively.

Compression ratio=(groove depth in feed zone)/(groove depth of metering zone) (4)

Apparent shear rate=$(\pi \times D \times n)/(60 \times H)$ (5) D, n and H indicate the diameter (mm) of the screw (31), the screw speed (r.p.m.) and the groove depth (mm), respectively. The screw can be rotated and moved reciprocatorily in its axial direction by a screw driving device (33). In this example, the compression rate of the screw was 3.14. The apparent shear rate of the screw was 71.8 $\sec^{-1}$ when the screw was rotated at the screw speed of 60 r.p.m.

Figure 5:
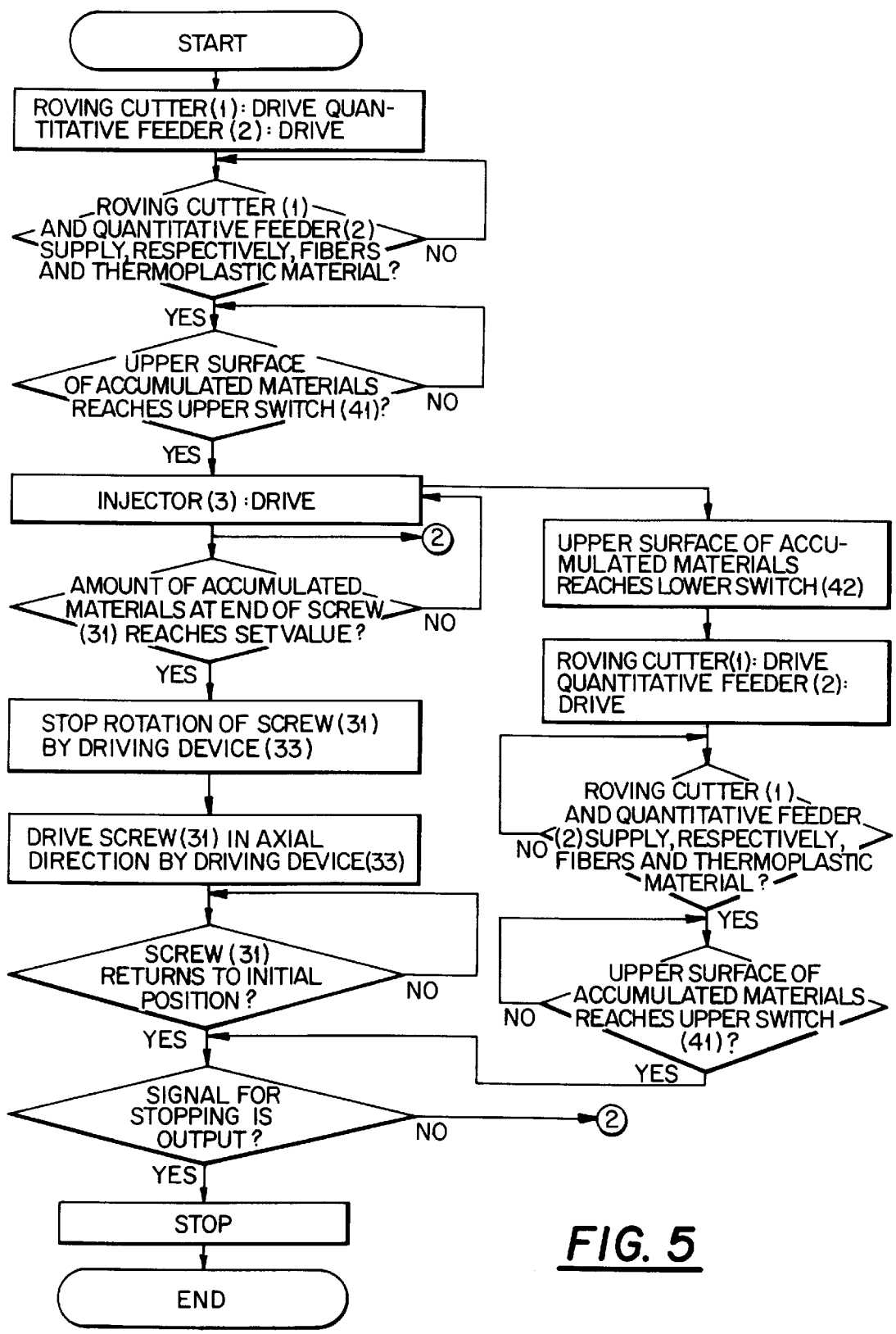
FIG. 5 shows flow charts of one example of the process of the present invention.

The above-mentioned raw material-feeding apparatus (A) and the plasticizing apparatus (B) work, for example, under a control by a computer according to the flow-chart shown in FIG. 5. One example of the process for producing the fiber-reinforced molded article of the present invention using the molding machine having the raw material-feeding apparatus (A), the plasticizing apparatus (B) and the molding apparatus will be described below.

The work of the molding machine is commenced by starting the roving cutter (1) and the quantitative feeder (2). The pellets of the thermoplastic material are fed, together with the modifier previously dry-blended, into the hopper (21) of the quantitative feeder (2) and supplied, in order, onto the conveyer (2). The pellets of the thermoplastic material are conveyed by the conveyer (2) to the shoot (6). The pellets slip on the shoot to be fed into the hopper (4). Simultaneously, the reinforcing fibers cut by the roving cutter (1) is fed into the hopper (4) via the inner pipe (5). The pellets of the thermoplastic material and the reinforcing fibers are accumulated in the hopper (4).

The arrival of the upper surface of the accumulated materials at the upper switch (41) provided to the hopper (4) stops the roving cutter (1) and the quantitative feeder (2) and stop feeding the reinforcing fibers and the pellets of the thermoplastic material into the hopper (4).

After making sure that the upper surface of the accumulated materials in the hopper (4) has reached the upper switch (41) and the screw (31) is located at a predetermined position in the injector (3), the rotation and retraction of the screw is commenced. Plastication of the thermoplastic material and kneading of the thermoplastic material and the reinforcing fibers are continued to produce the kneaded material containing the thermoplastic material and the reinforcing fibers in the injector (3) until the screw retracts to another predetermined position. As the screw retracts, the reinforcing fibers and the pellets of the thermoplastic material accumulated in the hopper (4) are supplied into the injector (3) and these materials in the hopper (4) decrease. Arrival of the upper surface of the accumulated materials in the hopper (4) at the lower switch (42) starts the roving cutter (1) and the quantitative feeder (2) to start feeding of the reinforcing fibers and the pellets of the thermoplastic material. Feeding of these materials is continued until the upper surface of the accumulated materials in the hopper (4) reaches the upper switch (41).

After making sure that the screw (31) in the injector (3) has retracted to the predetermined position and the molding apparatus (C) including the mold (8) and the press device (7) is in the predetermined condition, the kneaded material is injected from the injector (3) to be supplied into the cavity (X) through the passage (9) provided in the mold (8). The kneaded material supplied into the cavity is formed to the predetermined shape in the cavity. After cooling in an adequate degree, the fiber-reinforced molded article is taken out from the mold.

After the kneaded material being injected from the injector (3) and making sure that the upper surface of the accumulated materials has reached the upper switch (41) and the screw (3) is located at the predetermined position, the foregoing series of operations are repeated.

In the above example, the reinforcing fibers and the pellets of the thermoplastic material were quantitatively fed into the hopper (4). In the hopper (4), a large portion of the reinforcing fibers is located near the center of the hopper with being surrounded by a large portion of the pellets of the thermoplastic material. Consequently, since there are few reinforcing fibers near the inner wall of the hopper (4), the time taken to uniformly disperse the reinforcing fibers into the thermoplastic material became constant and the content of the reinforcing fibers in the fiber-reinforced molded article also became constant.

This example used glass fibers and polypropylene resin, respectively, as the reinforcing fibers and the thermoplastic material. The glass fibers with a length of 14 mm were fed into the hopper (4) in a rate of 2.2 kg/min from the roving cutter (1) via the inner pipe (5). The pellets of the polypropylene resin were fed into the hopper (4) in a rate of 5.1 kg/min with being collided with the outer wall of the inner pipe (5). It took eighteen seconds from the start of rotating the screw to the completion of producing 2.2 kg of kneaded material containing both the glass fibers and the polypropylene resin. The time from the start of rotating the screw to the completion of producing the kneaded material is called the plasticizing time. The kneaded material is called plasticized fiber-reinforced polypropylene resin.

The weight of the glass fiber-reinforced molded article and the plasticizing time were approximately constant for each repeated molding cycle. The glass fibers and the pellets of the polypropylene resin were smoothly fed into the hopper (4) without clogging the hopper (4).

Figure 6:
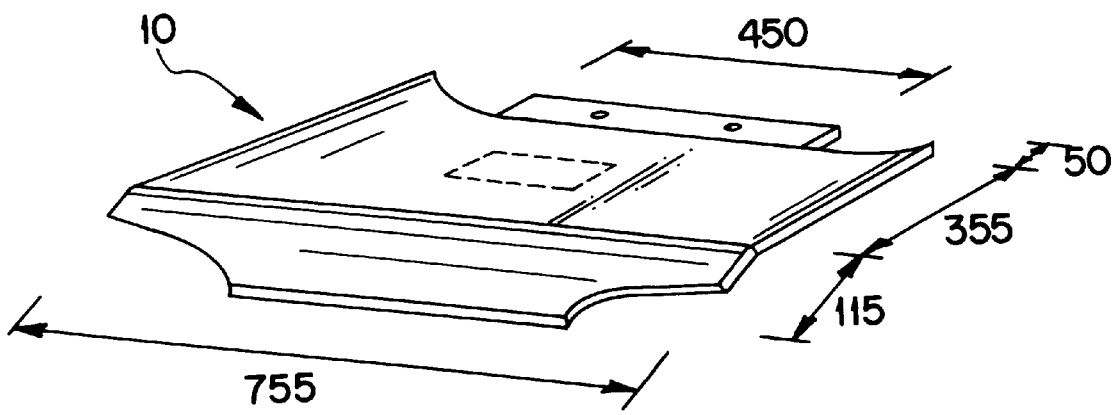
FIG. 6 is a perspective view of one example of a fiber-reinforced molded article obtained by the process of the present invention.

FIG. 6 illustrates the perspective view of the fiber-reinforced molded article obtained in the example. Bending test according to JIS K 7203 and Izod impact test according to JISK 7110were carried out for test specimens cut from the center portion of the molded article. The weight average length and the number average length of the reinforcing fibers contained in the fiber-reinforced molded article were obtained using the test specimens. The content of the glass fibers was 31.0% by weight. The above example is indicated as Example 1. The test results are shown in Table 1.

In Example 2, the glass fiber-reinforced polypropylene resin molded article was produced according to the same manner as described in Example 1, except for cutting the glass fibers into 6 mm length by the roving cutter (1). The bending test and Izod impact test were carried out and the weight average length and the number average length were obtained in a manner similar to that of Example 1. The content of the glass fibers was 30.5% by weight. The test results are shown in Table 1.

TABLE 1

Test result

|  | Example 1 | Example 2 |
| --- | --- | --- |
| Lw (mm) | 4.2 | 2.6 |
| Ln (mm) | 3.4 | 2.3 |
| Lw/Ln | 1.24 | 1.13 |
| Bending modulus of elasticity (GPa) | 4.84 | 5.15 |
| Bending strength (MPa) | 115.1 | 121.1 |
| Izod impact strength (kg) | 21.9 | 15.3 |

The fiber-reinforcing molded article made of the thermoplastic material of the present invention is extremely superior in physical properties such as impact strength, because it contains the reinforcing fibers with a length of about 3 mm to about 50 mm.

What is claimed is:

1. A molded article made of fiber-reinforced thermoplastic material which is obtained by a process comprising the following steps of:

(i) providing a molding machine comprising (a) a plasticizing apparatus having an opening for receiving raw materials, (b) an apparatus for feeding the raw materials, into the plasticizing apparatus, said apparatus for feeding including feeders for discharging reinforcing fibers of a predetermined length and a thermoplastic material in a solid state, and a (c) molding apparatus having a cavity;

(ii) feeding thermoplastic material in a solid state and reinforcing fibers, said reinforcing fibers having been previously cut to a length of from about 3 mm to 50 mm simultaneously into the plasticizing apparatus through the opening from the feeding apparatus;

(iii) melting the thermoplastic material and kneading the thermoplastic material and the reinforcing fibers in the plasticizing apparatus to produce a kneaded material;

(iv) supplying the kneaded material to the molding apparatus from the plasticizing apparatus; and (v) molding the kneaded material into the molded article in the cavity, wherein the molded article contains reinforcing fibers of a weight average length of about 2 mm or more.

2. A fiber-reinforced molded article according to claim 1, wherein the reinforcing fibers contained in the molded article have a ratio of a weight average length to a number average length of 1.1 or more.

3. A fiber-reinforced molded article according to claim 1, wherein the content of the reinforcing fibers in the molded article falls within the range of from about 20% by weight to about 75% by weight.

4. A fiber-reinforced molded article according to claim 1, wherein the reinforcing fibers contained in the molded article have a diameter from about 6 $\mu$m to about 25 $\mu$m.

5. A process for producing a molded article made of fiber-reinforced thermoplastic material, the process comprising the following steps of:

providing a molding machine comprising a plasticizing apparatus having an opening for receiving raw materials, an apparatus for feeding the raw materials to the plasticizing apparatus, the apparatus for feeding including feeders for discharging reinforcing fibers with a predetermined length and a solid thermoplastic material, and a molding apparatus having a cavity;

simultaneously feeding both thermoplastic material in a solid state and reinforcing fibers, said reinforcing fibres having been previously reduced to a length from about 3 mm to about 50 mm, into the plasticizing apparatus through the opening from the feeding apparatus;

melting the thermoplastic material and kneading the thermoplastic material and the reinforcing fibers in the plasticizing apparatus to produce a kneaded material;

supplying the kneaded material to the molding apparatus from the plasticizing apparatus; and molding the kneaded material into the molded article in the cavity, wherein said molded article contains reinforcing fibers having a weight average length of about 2 mm or more.

6. A process according to claim 1, wherein (ii) said reinforcing fibers comprise chopped strands.

7. A process according to claim 6, wherein said chopped stands are obtained by cutting a continuous strand.

8. A process according to claim 7, wherein (ii) the solid thermoplastic material comprises one pellets, granules or powder.

* * * * *